United States Patent
Mennig et al.

(10) Patent No.: US 10,161,043 B2
(45) Date of Patent: Dec. 25, 2018

(54) FINE INTERFERENCE PIGMENTS CONTAINING GLASS LAYERS ON METAL, GLASS AND CERAMIC SURFACES AND METHOD FOR PRODUCTION THEREOF

(75) Inventors: Martin Mennig, Fischbach (DE); Helmut Schmidt, Saarbruecken-Guedingen (DE)

(73) Assignee: EPG (Engineered nanoProducts Germany) AG, Zweibruecken (DE)

( * ) Notice: Subject to any disclaimer, the term of this patent is extended or adjusted under 35 U.S.C. 154(b) by 798 days.

(21) Appl. No.: 12/519,102

(22) PCT Filed: Feb. 15, 2008

(86) PCT No.: PCT/EP2008/051869
§ 371 (c)(1),
(2), (4) Date: Aug. 21, 2009

(87) PCT Pub. No.: WO2008/099008
PCT Pub. Date: Aug. 21, 2008

(65) Prior Publication Data
US 2010/0028631 A1    Feb. 4, 2010

(30) Foreign Application Priority Data
Feb. 15, 2007 (DE) .................. 10 2007 007 526

(51) Int. Cl.
| | | |
|---|---|---|
| B05D 5/00 | (2006.01) | |
| C23C 18/12 | (2006.01) | |
| C09D 11/037 | (2014.01) | |
| C09D 7/61 | (2018.01) | |
| C08K 3/34 | (2006.01) | |
| C08K 9/04 | (2006.01) | |

(52) U.S. Cl.
CPC ............ C23C 18/1283 (2013.01); C09D 7/61 (2018.01); C09D 11/037 (2013.01); C23C 18/127 (2013.01); C23C 18/1212 (2013.01); C23C 18/1241 (2013.01); C23C 18/1254 (2013.01); C23C 18/1275 (2013.01); C23C 18/1279 (2013.01); C08K 3/34 (2013.01); C08K 9/04 (2013.01); Y10T 428/24901 (2015.01)

(58) Field of Classification Search
USPC ...................................................... 427/379
See application file for complete search history.

(56) References Cited

U.S. PATENT DOCUMENTS

| | | | |
|---|---|---|---|
| 4,482,097 A * | 11/1984 | Stone | H02K 7/14 241/101.2 |
| 6,162,498 A | 12/2000 | Mennig et al. | |
| 6,689,205 B1 | 2/2004 | Bruckner et al. | |
| 7,303,622 B2 | 12/2007 | Loch et al. | |
| 2002/0086113 A1* | 7/2002 | Leigeber et al. | 427/331 |
| 2002/0134282 A1 | 9/2002 | Ostertag et al. | |
| 2005/0129959 A1* | 6/2005 | Roemer-Scheuermann et al. | 428/426 |
| 2006/0070552 A1 | 4/2006 | Loch et al. | |
| 2008/0118745 A1 | 5/2008 | Endres et al. | |
| 2008/0122217 A1* | 5/2008 | Rancien et al. | 283/72 |

FOREIGN PATENT DOCUMENTS

| | | |
|---|---|---|
| CN | 1168850 C | 9/2004 |
| DE | 42 12 119 A1 | 10/1993 |
| DE | 42 15 276 A1 | 11/1993 |
| EP | 1 284 307 A1 | 2/2003 |
| TW | 200523326 A | 7/2005 |
| WO | 98/45502 A1 | 10/1998 |
| WO | 2005/066388 A2 | 7/2005 |

OTHER PUBLICATIONS

Reed et al (Principles of Ceramic Processing 2nd ed.(c) 1995 John Wiley& Sons, Inc New York, NY, Chapter 17 pp. 313-332.*
Content of website captured Mar. 14, 2012 : http://www.print-media-academy.com/www/html/en/content/articles/education/in_the_know /print_buyer_services/passion_for_print_lips.*
Knieke et al "Particle Breakage in the Nanometer Range" Institute of Particle Technology, University of Erlangen-Nuremberg, Germany (2008) folk.ntnu.no/skoge/prost/proceedings/aiche-2008/data/papers/P130379.pdf; 8 pages. (Year: 2008).*
English language abstract of 1 284 307 A1.
English language abstract of 42 12 119 A1.
English language abstract of 42 15 276 A1.

* cited by examiner

Primary Examiner — Nathan H Empie
(74) Attorney, Agent, or Firm — Abel Law Group, LLP

(57) ABSTRACT

A process for providing a substrate having a metal, glass or ceramic surface with a vitreous layer comprising an interference pigment. The process comprises comminuting an interference pigment having at least one dielectric interference layer by a wet grinding process; dispersing the comminuted interference pigment into a silicate-containing suspension to obtain a coating composition; applying the coating composition to the surface by a wet coating process; and densifying the coating composition at a temperature of not more than 650° C.

20 Claims, No Drawings

FINE INTERFERENCE PIGMENTS CONTAINING GLASS LAYERS ON METAL, GLASS AND CERAMIC SURFACES AND METHOD FOR PRODUCTION THEREOF

BACKGROUND OF THE INVENTION

1. Field of the Invention

The invention relates to a process for producing a substrate which has a metal, glass or ceramic surface and has been provided with a glasslike layer comprising interference pigments, the substrate obtained and its use.

2. Discussion of Background Information

Nanoglass layers are described in WO 2005/066388 and WO 98/45502. They are consolidated at relatively high temperatures, which are, however, far below the transformation temperature of the glass in question, on metal substrates such as steels, aluminium or brass. The lower consolidation temperature possible compared to the information in the literature arises from the nanoscale structure of the layer applied from the liquid phase, which causes a high internal thermodynamic energy and which consequently lowers the consolidation temperature. This allows transparent, glasslike layers of very low thickness (e.g. 3 to 10 µm) to be obtained on the metal, glass and ceramic surfaces mentioned. These layers are dense and mechanically very stable, but, in contrast to molten glasses, have a certain degree of plastic deformability.

It is also possible in principle to provide the liquid coating materials with thermally stable pigments. In that case, no longer transparent, but rather coloured, glass layers arise, which serve as a matrix for the pigments.

To produce well-defined layers, the pigment diameter generally must not exceed one tenth of the layer thickness, since smooth layers otherwise cannot be obtained and the pigments project from the surface. This means that, to produce impeccable nanoglass layers, the pigment diameter, according to the layer thickness, must not exceed 2 to 5 µm. Common pigments are, however, generally obtainable only with diameters in the micrometer range. This is for various reasons:

- The comminution of the pigments to particle sizes below 1 µm is additionally very complicated and is not possible in many cases.
- Very fine pigments generally cause a different colour effect (brightening) from corresponding pigments with diameters above 1 µm.

This finding is in principle valid for all types of pigments, i.e. even for pigments which are not based exclusively on the electronic absorption of parts of the electromagnetic spectrum, but rather on the interference of dielectric layers matched to one another with different refractive indices, optionally in combination with absorption effects. In the case of such interference pigments, compared to conventional pigments, there is, however, the further problem that, in the case of mechanical comminution, the interference layers of the pigments are damaged or even destroyed, such that the colour effect suffers or is even generally destroyed completely. The interference pigments currently available on the market have a diameter of generally significantly more than 10 µm. For the reasons mentioned above, manufacturers of interference pigments state that it is not possible to subject these pigments to a comminution process.

It is possible in principle to produce the above-described nanoglass layers with such interference pigments, but, owing to the relative size of these interference pigments, the resulting layers are rough for the reasons explained at the outset, some of them are cracked, and they are generally not impervious and/or contain pores as a result of the consolidation problems caused by the pigments. On the other hand, such nanoglass layers comprising interference pigments are very attractive for decorative reasons, since it would thus be possible for the first time to provide layers based on nanoglass with these luster pigments and open them up to an application.

The inventive objective consisted in producing nanoglass layers with incorporated pigments based on interference, without the abovementioned disadvantages in relation to the layer properties occurring, and the customary interference pigments which are commercially available should be used as a starting material. At the same time, the extent to which the interference pigments are also suitable for the achievement of layers with low roughness on other inorganic surfaces too, for example glass surfaces and ceramic surfaces, should be examined.

The object of the invention is surprisingly achieved by virtue of it being possible, with the aid of a wet grinding process, particularly by virtue of the use of a wet ball grinding process, and especially with use of a high-speed rotary ball mill with a rotor and stator, to grind the pigments sufficiently gently that, firstly, the interference effect was maintained virtually completely, and, secondly, the particle size was reduced such that qualitatively high-value nanoglass layers comprising interference pigments were obtainable.

SUMMARY OF THE INVENTION

The present invention provides a process for providing a substrate having a metal, glass or ceramic surface with a vitreous layer comprising an interference pigment. The process comprises (a) comminuting an interference pigment having at least one dielectric interference layer by a wet grinding process; (b) dispersing the comminuted interference pigment into a silicate-containing suspension in order to obtain a coating composition; (c) applying the coating composition to the metal, glass or ceramic surface by a wet coating process; and (d) densifying the applied coating composition at a temperature of not more than 650° C. to form the vitreous layer.

In one aspect of the process, in (a) the pigment may be comminuted to a particle size below 6 µm.

In another aspect, in (a) the interference pigment may be comminuted in a ball mill, for example, a rotary ball mill.

In yet another aspect, the interference pigment may comprise a pigment which has an inorganic support. For example, the inorganic support may be selected from one or more of mica, $SiO_2$ glass, and metal foil.

In a still further aspect of the process, the interference pigment may comprise one or more Iriodin pigments.

In another aspect of the process of the present invention, in (a) a suspension comprising the interference pigment may be treated in a rotary ball mill for from 1 to 6 hours.

In another aspect, following (a) the interference pigment may be mixed directly as a suspension with the silicate-containing suspension, or following (a) the interference pigment may be removed from the liquid phase used for grinding and dried, and added as a powder to the silicate-containing suspension.

In a further aspect of the process, the silicate-containing suspension may comprise a coating sol which comprises silicate particles modified with organic groups and/or the silicate-containing suspension may comprise a coating sol which is obtainable by a process which comprising the hydrolysis and polycondensation of one or more silanes of formula (I):

$$R_nSiX_{4-n} \quad (I)$$

in which the groups X are the same or different from one another and are each hydrolysable groups or hydroxyl groups, the radicals R are the same or different from one another and are each hydrogen, alkyl groups, alkenyl groups and alkynyl groups having up to 4 carbon atoms and aryl groups, aralkyl groups and alkaryl groups having 6 to 10 carbon atoms, n is 0, 1 or 2, with the proviso that at least one silane where n=1 or 2 is used, or oligomers derived therefrom;
in the presence of at least one of (i) at least one compound from the group of oxides and hydroxides of alkali metals and alkaline earth metals and (ii) nanoscale $SiO_2$ particles. For example, (i) may be used in such an amount that the atomic ratio of Si:alkali metal/alkaline earth metal is from 20:1 to 7:1 and/or the average value of n in formula (I) may be from 0.2 to 1.5.

In yet another aspect of the process of the present invention, the proportion of the interference pigment in the coating composition to be applied may be from 0.1% to 15% by weight, based on a total weight of the coating composition and/or the coating composition may be applied in a wet film thickness of from 4 μm to 20 μm.

In a still further aspect of the process, in (d) a consolidation of the applied coating composition may be effected at a maximum densification temperature of from 300° C. to 650° C. and/or a thermal consolidation may be effected in an oxygen containing, inert or reducing atmosphere, and several stages with different atmospheric and/or temperature conditions may be passed through.

In another aspect, in (d) a densification may be effected in a two-stage thermal treatment process, the thermal treatment being carried out in a first stage (A) in an oxygen containing atmosphere or (B) under vacuum at a residual pressure of 5 to 15 mbar, and, in a second stage, in a low-oxygen atmosphere until complete densification to form a vitreous layer.

In another aspect, a cooling phase of the thermally treated substrate may be carried out in an oxygen containing or low-oxygen atmosphere.

The present invention also provides a substrate having a metal, glass or ceramic surface. The substrate is provided with a vitreous silicate layer comprising therein an interference pigment which has been comminuted by a wet grinding process and has a particle size below 6 μm.

In one aspect, the substrate may be or may comprise a metal part made of at least one of steel, stainless steel, aluminium, and brass.

In another aspect, the substrate may be at least one of a metal part of a vehicle, especially a land, water, air or space vehicle, especially an exhaust system, a piece of domestic or office equipment, a vessel, a light switch, a piece of furniture, a housing of an electronic or electrical appliance, a machine or a system from medical technology or machinery and plant construction, a building, a facade or façade cladding, a handrail, a wall or floor element, fittings, a piece of sport or leisure equipment, or an eloxal substitute.

The present invention also provides a printing ink composition. The composition comprises a silicate composition and an interference pigment which has been comminuted by a wet grinding process and has a particle size below 6 μm.

DETAILED DESCRIPTION OF THE INVENTION

Interference pigments are common knowledge and are commercially available. Examples are Irinodin® pigments from Merck. All known interference pigments are suitable for the present invention.

Suitable interference pigments are especially those which have one or more layers on a pigment or support generally being in platelet form. In general, the support is enveloped by the layer(s). The pigments used may especially be all interference pigments with an inorganic support. Examples of suitable inorganic supports are mica, $SiO_2$ glass or metal foil. Suitable layers which are present on the support are, for example, oxide layers, especially metal oxide layers. The layers are dielectric layers which may lead to interference effects. Examples of suitable materials for the layers are metal oxides of silicon, titanium, iron, zirconium, aluminium and tin or mixtures thereof, but materials such as $MgF_2$ or ZnS may also be suitable. In the presence of two or more layers, identical or different materials may be used. Variation of the type of support element, number, thickness and material of the layers, etc. allows different effects to be obtained. Preference is given to effect pigments based on mica, for example the known Iriodin® pigments from Merck, in which mica is enveloped with one or more metal oxide layers. Iriodin® pigments are available in more than 1000 colour shades.

In the first step, customary interference pigments are subjected to a wet grinding process in order to achieve mechanical comminution of the pigments. For this purpose, the interference pigments are used in a liquid phase, i.e. as a suspension. The liquid phase used may be any inorganic or organic dispersion medium or solvent, provided that it does not or essentially does not dissolve the particles to be treated. The suitable dispersion medium, according to the particles to be treated, is preferably selected from inorganic solvents, such as water, especially deionised water, and organic solvents, or mixtures thereof. The dispersion media may be polar, nonpolar or aprotic dispersants.

Examples of organic dispersion media are alcohols, e.g. alcohols having 1 to 8 carbon atoms, such as methanol, ethanol, n- and i-propanol, butanol, octanol, cyclohexanol, ketones, e.g. ketones having 1 to 8 carbon atoms, such as acetone, butanone and cyclohexanone, esters such as ethyl acetate and glycol esters, ethers such as dimethyl ether, diethyl ether, dibutyl ether, anisole, dioxane, tetrahydrofuran and tetrahydropyran, glycol ethers such as mono-, di-, tri- and polyglycol ether, glycols such as ethylene glycol, diethylene glycol and propylene glycol, amides and other nitrogen compounds such as dimethylacetamide, pyridine and acetonitrile, sulphoxides and sulphones, aliphatic, alicyclic or aromatic hydrocarbons, for example having 5 to 15 carbon atoms, for example pentane, hexane, heptane, octane, cyclohexane, benzines, petroleum ether, methyl-cyclohexane, decalin, terpene solvents, benzene, toluene and xylenes, halohydrocarbons such as dichloromethane, chloroform, carbon tetrachloride and ethylene chloride, and chlorofluorocarbons or mixtures thereof. Preferred solvents are alcohols and water and mixtures thereof.

The suspension obtained by mixing interference pigment and dispersion medium may also include a slurry or paste. To suspend the interference pigments, further additives, such as dispersing agents and rheological aids, can be added, but this is generally not necessary, and preference is given to using, for the grinding, only a mixture of interference pigment and dispersion medium and optionally additionally a dispersing agent. The dispersing agents used, which are also referred to as emulsifiers or surfactants, may be all suitable dispersing agents known to those skilled in the art. A suitable dispersing agent may be selected by the person skilled in the art according to the type of pigment and of the dispersion medium. Examples of dispersing agents can be found, for example, in Ullmanns Encyclopädie der technischen Chemie, 4th edition, under the chapters of Surfactants (Vol. 22, p. 455 ff.) and Emulsions (Vol. 10, p. 449 ff). Suitable examples are, for example, Disperbyk® 101, amines such as triethanolamine or silanes such as γ-aminopropyltriethoxysilane.

The wet grinding can be carried out with customary and known apparatus, such as apparatus for comminuting, kneading or grinding. Examples of suitable wet grinding apparatus are dispersers, turbomixer, nozzle-jet dispersers, roll mills, mills and kneaders. Examples of mills and kneaders are mills with loose milling tools, such as ball mills, rod mills, drum mills, conical mills, tube mills, autogenous mills, planetary mills, vibrating mills and stirred mills, shear roll kneaders, mortar mills and colloid mills. Apparatus used with preference is homogenizers, turbomixer, ball mills, rod mills, planetary mills and vibrating mills, stirred mills, roll mills, colloid mills and kneaders. Particular preference is given to using, as the wet grinding apparatus, a rotary ball mill with a rotor and stator, which is preferably a high-speed rotary ball mill with rotor and stator.

The appropriate temperature for the wet grinding to comminute the pigments can be established by the person skilled in the art. It is possible to work, for example, at room temperature or ambient temperature (e.g. 15 to 30° C.). The grinding step may bring about heating. This may be desired, but it is also possible if required to cool with customary cooling units. The means of establishing the desired temperature during the process are known to those skilled in the art.

The duration of the wet grinding depends, of course, upon factors including the apparatus used, the energy input, the dispersion media and interference pigments used, their proportions and the desired degree of comminution, and can therefore vary within wide ranges; for example, it may be several minutes up to days. In a rotary ball mill, for example, grinding over a period of 1 to 6 h may be appropriate for a suitable comminution. The grinding can be effected in a two-stage or multistage configuration. In the case of multiple stages, the stages may differ, for example, in the energy input or in the type of grinding bodies used.

The content of the interference pigments in the suspension for the wet grinding may likewise vary within wide ranges and depends upon factors including the apparatus used and the materials used and can be established in a suitable manner by the person skilled in the art. The wet grinding process can be carried out either continuously in single-pass operation, multipass operation (shuttle method) or circulation process, or batchwise in batch operation.

In a preferred embodiment, interference pigments are dispersed in a dispersion medium, preferably an alcohol, and subjected to a comminution process in a high-speed rotary ball mill with rotor and stator over several hours, preferably 1 to 6 hours, in the course of which the material for grinding is circulated.

The starting materials used for the interference pigments may, as explained above, be customary interference pigments of any size. The interference pigments currently available on the market generally have a diameter of significantly more than 10 µm. It is possible, for example, to use interference pigments with a mean particle diameter of 5 to 25 µm. According to manufacturer data, the mean particle diameter specified is a range of particle diameters present, which is determined by Malvern laser diffraction.

The interference pigments used as starting materials are then comminuted by the wet grinding process explained above, i.e. the particle size of the starting material is reduced by the wet grinding process. The interference pigments are comminuted by the wet grinding process preferably to a particle size below 6 µm and preferably below 5 µm, e.g. 1 µm to 5 µm.

What is meant here by a particle size of below 6 µm is that the majority of the pigments and preferably essentially all pigments have a particle size below 6 µm; preferably at least 90%, more preferably at least 95%, even more preferably at least 99% and especially preferably at least 99.5% or 100% of all particles, based on the number, have a particle size below 6 µm. The particle size is determined by means of light microscopy by visual image evaluation. Other determination methods are also known, for example Malvern laser diffraction. Since the particles are essentially platelet-shaped particles, the lateral diameter or the equivalent diameter of the circle equal to the projection area in a stable particle position is taken as the particle size.

In spite of the warning from the manufacturer that the pigments will lose their color on comminution, it has been found that, starting from interference pigments with a mean particle diameter of 5 to 25 µm, on comminution to a mean particle diameter of about 2 to 5 µm, no difference in the colour effect can be detected with the naked eye.

After the wet grinding process, a suspension of the comminuted interference pigments is obtained. The pigment can then be removed by conventional methods from the liquid phase used for grinding and dried. The resulting powder can then be mixed with the silicate-containing suspension in order to obtain the coating composition. Of course, it is also possible to mix the powder of the interference pigments obtained after removal of the liquid phase with another dispersion medium (solvent exchange) before addition to the silicate-containing suspension.

Alternatively, it is possible to mix the suspension of the comminuted interference pigments obtained by the wet grinding process directly with the silicate-containing suspension in order to obtain the coating composition. This is advantageous when the liquid phase used for grinding is chemically compatible with the sol (for example alcohol). Here too, of course, variations are possible according to the purpose, for example concentration or dilution of the suspension obtained by the wet grinding process by partial removal of the liquid phase and/or addition thereof or of another dispersion medium. Useful dispersion media for any partial or complete exchange to be undertaken include the same dispersion media which have already been illustrated above.

The comminuted interference pigments in powder form or as suspension are then dispersed into a silicate-containing suspension, preferably a silicate sol, i.e. the suspension comprises a silicate composition. The silicate-containing suspension is preferably a sol which comprises silicate particles modified with organic groups. Silicate-containing suspensions used with preference are the coating sols which are described in WO 2005/066388, which are hereby incorporated by reference.

The silicate-containing composition used is preferably a composition which is obtained by hydrolysis and polycondensation of at least one organically modified hydrolysable silane in the presence of alkali metal oxides or hydroxides or alkaline earth metal oxides or hydroxides and/or nanoscale SiO$_2$ particles.

Such a composition or suspension is, for example, obtainable by hydrolysis and polycondensation of one or more silanes of the general formula (I)

$$R_nSiX_{4-n} \qquad (I)$$

in which the X groups are the same or different from one another and are each hydrolysable groups or hydroxyl groups, the R radicals are the same or different from one another and are each hydrogen, alkyl groups, alkenyl groups and alkynyl groups having up to 4 carbon atoms and aryl groups, aralkyl groups and alkaryl groups having 6 to 10 carbon atoms, n is 0, 1 or 2, with the proviso that at least one silane where n=1 or 2 is used, or oligomers derived therefrom in the presence of a) at least one compound from the group of the oxides and hydroxides of the alkali metals and alkaline earth metals and/or b) nanoscale SiO$_2$ particles.

Preference is given to using at least two silanes of the general formula (I) in combination. The average value of n (on a molar basis) of the starting silanes of the formula (I) used is preferably 0.2 to 1.5 and more preferably 0.5 to 1.0.

In the general formula (I), the X groups, which are the same or different from one another, are hydrolysable groups or hydroxyl groups. Specific examples of hydrolysable X groups are halogen atoms (especially chlorine and bromine), alkoxy groups and acyloxy groups having up to 6 carbon atoms. Particular preference is given to alkoxy groups, especially $C_{1-4}$-alkoxy groups, such as methoxy, ethoxy, n-propoxy and i-propoxy, particular preference being given to methoxy or ethoxy groups.

The R groups in the general formula (I), which, in the case that n=2, may be the same or different, are each hydrogen, alkyl, alkenyl and alkynyl groups having up to 4 carbon atoms, and aryl, aralkyl and alkaryl groups having 6 to 10 carbon atoms. Specific examples of such groups are methyl, ethyl, n-propyl, i-propyl, n-butyl, sec-butyl and tert-butyl, vinyl, allyl and propargyl, phenyl, tolyl and benzyl. Preferred R groups are alkyl groups having 1 to 4 carbon atoms, especially methyl and ethyl, and also phenyl.

It is preferred in accordance with the invention when at least two silanes of the general formula (I) are used, where n=0 in one case and n=1 in the other case. Preference is given to mixtures of at least one alkyltrialkoxysilane, such as (m)ethyltri(m)ethoxysilane, and at least one tetraalkoxysilane, such as tetra(m)ethoxysilane ("(m)eth" means "meth" or "eth").

Nanoscale SiO$_2$ particles are preferably understood to mean SiO$_2$ particles with an average particle diameter of not more than 100 nm, more preferably not more than 50 nm and especially not more than 30 nm. The mean particle diameter is understood here, unless stated otherwise, to mean the volume-average particle diameter ($d_{50}$ value), which can be measured using a UPA (Ultrafine Particle Analyzer, Leeds Northrup (laseroptics, dynamic light scattering)). It is possible to use, for example, commercial silica products, e.g. silica sols such as the Levasils®, silica sols from Bayer AG, or fumed silicas, e.g. the Aerosil products from Degussa. When nanoscale SiO$_2$ particles are added, the ratio of all Si atoms in the silanes of the general formula (I) to all Si atoms in the nanoscale SiO$_2$ particles is preferably in the range of 5:1 to 1:2, especially 3:1 to 1:1.

Alternatively or additionally to the nanoscale SiO$_2$ particles, the hydrolysis and polycondensation of the silanes of the formula (I) can be carried out in the presence of at least one compound from the group of the oxides and hydroxides of the alkali metals and alkaline earth metals. These oxides and hydroxides are preferably those of Li, Na, K, Mg, Ca and/or Ba. Preference is given to using alkali metal hydroxides, especially NaOH and KOH. When an alkali metal oxide or hydroxide or alkaline earth metal oxide or hydroxide is used, the atomic Si:alkali metal or alkaline earth metal ratio is preferably in the range of 20:1 to 7:1, especially of 15:1 to 10:1. The atomic ratio of silicon to alkali metal or alkaline earth metal is selected to be sufficiently great that the resulting coating is not water-soluble.

When oxides and hydroxides of the alkali metals and alkaline earth metals are used, the hydrolysis and polycondensation obviously takes place in an alkaline medium, which is advantageous especially when metallic surfaces (for example of steel) which have only low resistance, if any, to attack by acids are to be provided with a glasslike coating by the process according to the invention. When the hydrolysis and polycondensation of the silanes is carried out only in the presence of the nanoscale SiO$_2$ particles, it is generally acid-catalysed, generally with an inorganic acid.

In a preferred embodiment, the hydrolysis and polycondensation of the silanes are carried out in the presence of at least one compound from the group of the oxides and hydroxides of the alkali metals and alkaline earth metals and optionally also of nanoscale SiO$_2$ particles. The hydrolysis and polycondensation can be carried out in the absence or presence of a solvent. Examples thereof are the dispersion media mentioned above. Suitable solvents are especially water-miscible organic solvents, for example alcohols, ethers, esters or ketones, preference being given to alcohols. In general, even without use of SiO$_2$ particles in the hydrolysis and polycondensation, nanoscale particles are formed from the hydrolysable compounds. In a preferred embodiment, the silicate-comprising composition therefore comprises nanoscale particles, for example with a mean particle diameter below 200 nm, especially SiO$_2$ particles or silicate particles.

The hydrolysable silanes are hydrolysed and polycondensed generally by the sol-gel process. In the sol-gel process, hydrolysable compounds are usually hydrolysed and possibly at least partly condensed with water, optionally under acidic or basic catalysis. It is possible to use stoichiometric amounts of water, but also lesser or greater amounts. The sol which forms can be adjusted to the viscosity desired for the coating composition by suitable parameters, for example degree of condensation, solvent or pH. Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

The interference pigment is dispersed into the silicate-containing suspension in order to obtain the coating composition. In general, simple stirring-in is sufficient. The proportion of the comminuted interference pigment which is added to the silicate-containing suspension may vary to a high degree according to the end use. For example, the interference pigment comminuted by the above-described grinding process can be dispersed with a content of 0.1 to 15% by weight, preferably of 1 to 6% by weight and more preferably of 1.5 to 3% by weight, based on the total weight of the coating composition to be applied (including dispersion medium). The selection of the pigment content can be used to influence the roughness of the coating, the degree of coverage on the metal substrate and the scratch and abrasion resistance of the layer comprising ultrafine interference pigment.

If required, customary paint additives can be added to the coating composition, for example additives which control the rheology and the drying behaviour, wetting and levelling aids or defoamer. It is also possible, for example, to add conventional matting agents such as microscale $SiO_2$ particles or ceramic powders in order to achieve matt layers with anti-fingerprint properties.

The substrate has a metal, glass or ceramic surface, preference being given to the coating of metal surfaces. The substrate may consist entirely of metal, glass or ceramic, or only part thereof. It is possible, for example, for a coating of metal, glass or ceramic to serve as the surface to be coated on a substrate of another material.

Examples of glass are soda-lime glass, borosilicate glass, lead crystal and silica glass. The glass may, for example, be plate glass, hollow glass such as vessel glass, or laboratory equipment glass. The ceramic is, for example, ceramic based on the oxides $SiO_2$, $Al_2O_3$, $ZrO_2$ or MgO, or the corresponding mixed oxides.

Suitable substrates with a metallic surface for coating in accordance with the invention are all objects, such as semi-finished products and finished products or parts thereof, which consist of a metal or a metal alloy or comprise at least one surface of a metal or a metal alloy. Examples of such metallic surfaces are aluminium, tin, zinc, copper, chromium, nickel, zinc-plated, chromium-plated or enamelled surfaces, steel, especially stainless steel, aluminium alloys, magnesium alloys and copper alloys such as brass and bronze. Particular preference is given to metallic surfaces of stainless steel, aluminium and brass. Particular advantages are achieved in the coating of objects which are subsequently shaped by cold working, since the inventive glasslike coating is deformable.

Before the application of the coating composition, the metallic surface can be cleaned, freed of grease and dust and/or subjected to a surface treatment, for example by corona discharge. The metallic surface or the metallic substrate may have a flat or a structured surface. The surface may be regular, as obtained, for example, by embossing or etching, or be irregular, as obtained, for example, by roughening. Roughening of the metallic surface is possible, for example, by sand-blasting, glass bead-blasting or brushing. The processes for structuring metallic surfaces are known to those skilled in the art. The structuring can, for example, achieve decorative effects. Particularly suitable metal, glass or ceramic surfaces are, for example, brushed metal substrates, especially stainless steel substrates.

The resulting coating composition comprising the interference pigments, especially as a coating sol, can be applied to the metal part to be coated with all common wet coating processes. The application is generally effected with a wet film thickness of 4 to 20 µm, preferably of 6 to 15 µm and more preferably of 10 to 12 µm.

Usable techniques for the application of the coating composition are, for example, dipping, casting, flow-coating, spinning, spraying, painting or screen-printing. The spraying technique is particularly preferred. For dilution, it is possible to use customary solvents as are common in the coatings industry.

The coating composition applied to the metallic surface is normally dried at room temperature (approx. 20° C.) or slightly elevated temperature, for example up to 100° C., especially up to 80° C. The coating applied is generally dust-dry after approx. 2 minutes at room temperature. The generally dried layer applied is then subjected to thermal consolidation at a temperature of not more than 650° C. in order to obtain the glasslike layer comprising comminuted interference pigments. The thermal densification step can in principle be carried out exactly according to the process described in WO 2005/066388, for which reason reference is made explicitly to this patent application especially with regard to the details of the conditions for the densification and it is hereby incorporated into the disclosure. In general, common ovens are used for the required heating for the consolidation; heating by IR or laser irradiation is also possible.

The maximum consolidation temperature is preferably in the range of 300° C. to 650° C., preferably of 400° C. to 560° C. and more preferably of 475° C. to 530° C. The thermal densification can be effected in an oxygen-containing atmosphere, in an inert atmosphere or in a reducing atmosphere, and several stages can be passed through.

The parameters used for the consolidation, such as atmosphere, rate of temperature increase, maximum end temperature, duration, cooling rate, etc. can be determined immediately by the person skilled in the art; reference is made in particular to the abovementioned WO 2005/066388. The densification can be carried out in one or more stages. Preference is given to a two-stage thermal treatment process, for example as explained in WO 2005/066388.

In the first thermal treatment stage, for example, in one variant, heating is effected in an oxygen containing atmosphere with an oxygen content of, for example, 15 to 90% by volume, preferably 19 to 20% by volume, up to an end temperature of about 200° C., or, in a second variant B, under reduced pressure at a residual pressure of 15 mbar or less, preferably 5 mbar and lower and more preferably about 2.5 mbar, up to an end temperature of about 500° C., preferably up to about 200° C. and more preferably up to about 180° C. In the second thermal treatment stage, further densification is effected to form a vitreous layer. The second thermal treatment stage can be carried out, for example, in a low-oxygen atmosphere with an oxygen content below 0.5% by volume, preferably up to an end temperature in the range of 400 to 600° C. The low-oxygen atmosphere used is preferably an inert gas such as nitrogen or argon, a reducing gas such as forming gas, or reduced pressure with an air pressure ≤10 mbar. The residence times at the maximum temperatures are typically 5 to 75 min, preferably 20 to 60 min and more preferably 45 to 60 min. The cooling phase of about 400 to 500° C. downward can be effected in low-oxygen atmosphere or in oxygenous atmosphere. Suitable cooling rates are, for example, 1 to 10 K/min, preferably 2 to 7 K/min.

The selection of the oven atmosphere in conjunction with the temperature or in conjunction with particular temperature ranges allows various coating properties to be influenced in a controlled manner. This relates, for example, according to the type of metal substrate, to possible tarnishing colours which can contribute to the overall visual image of the coated metal part in the case of incomplete coverage of coating comprising ultrafine interference pigment. Further layer properties are scratch resistance, porosity, hydrolytic stability and hydrophobicity or hydrophilicity of the coating. The visual effects achieved by incorporation of the comminuted interference pigments, which are also referred to here as ultrafine interference pigments, are surprisingly virtually indistinguishable from those which can be achieved in general with untreated pigments.

Glasslike layers on metallic surfaces are obtained without crack formation. The coating compositions can be converted to dense silicate or $SiO_2$ layers even at relatively low temperatures (generally from 400° C.). The densification affords a vitreous layer or glass layer. In the preferred embodiment, as explained above, nanoscale particles are obtained in the coating composition. The layer obtained therefrom is therefore also referred to as a nanoglass layer. The terms "vitreous layer", "glass layer" and "nanoglass layer" are used here in a mutually interchangeable manner.

The resulting vitreous layers preferably have a thickness of 10 µm or less, e.g. 1 to 6 µm, preferably 1.5 to 5 µm and especially 2.5 to 4.5 µm.

The inventive substrates with a metal, glass or ceramic surface, which are provided with a glasslike layer comprising comminuted interference pigments, can be used in a series of applications, especially for decorative purposes or for visual differentiation, if appropriate in conjunction with high corrosion protection, scratch protection, abrasion protection, high-temperature tarnishing protection and fingerprint protection, and also in conjunction with any combination of these properties.

Examples of substrates which can be provided with such a layer in accordance with the present invention are metal parts of vehicles of all types, especially of exhaust systems, and also for parts of ships and aircraft; of domestic appliances, light switches made of metal and metal furniture of all kinds; metal parts for metallic casing of mobile phones, still and video cameras, computers, laptops, music players such as MP3 players or iPods®, and other electronic equipment; of machines and systems in medical technology and of machinery and plant construction; for decorative corrosion protection on metal facades, especially on metal facades of aluminium, and also for metallic wall and floor elements; for sport and leisure equipment of all kinds. The inventive substrates are also suitable as an eloxal substitute. Further use examples can be taken from WO 2005/066388.

The coating composition explained above, comprising a silicate composition and interference pigments comminuted to a particle size below 6 µm by a wet grinding process, are also suitable for use as a printing ink, in which case a suitable viscosity is optionally established by removing or adding dispersion medium and additives customary for printing inks are optionally added. The coating composition is suitable, for instance, for printing inorganic substrates such as glass, metal, ceramic or glass-ceramic. Preferred printing processes are especially those with which very thin prints are possible, for example with a thickness of less than 20 µm or less than 30 µm. Examples of such printing process which enable a thin print are pad printing or flexographic printing, but also screenprinting with very fine screens.

The examples which follow illustrate the invention without restricting it.

Example 1

Production of a Silicate-containing Coating Sol

A sodium silicate coating sol was produced as described in WO 2005/066388. For this purpose, 25 ml (124.8 mmol) of methyltriethoxysilane (MTEOS) are stirred with 7 ml (31.4 mmol) of tetraethoxysilane (TEOS) and 0.8 g (20 mmol) of sodium hydroxide at room temperature overnight (at least 12 hours) until all of the sodium hydroxide has dissolved and a clear yellow solution is present.

Subsequently, 3.2 ml (177.8 mmol) of water are slowly added dropwise at room temperature, in the course of which the solution heats up. After the addition of water has ended, the clear yellow solution is stirred at room temperature until it cools again, and then filtered through a filter having a pore size of 0.8 µm.

Production of a Gold-coloured Coating Material 250 g of a pearlescent pigment mixture (Iriodin® 323 and Irinodin® 120 in a ratio of 1:1) were added suspended in 3 l of ethanol and ground in a rotary ball mill at 1500 rpm for 3 h in circulation. The wet grinding can also be carried out with a suspension to which 2 g of a customary dispersing agent, for example DISPERBYK 101, triethanolamine or γ-aminopropyltri-ethoxysilane, have additionally been added. Subsequently, the ground pigment mixture was added to the silicatic coating sol synthesised above without removing the ethanol beforehand. The pigment content was 3% by weight based on the coating sol.

Coating of Metallic Surfaces

This pigment-containing coating sol was used to coat stainless steel plates (10×10 cm$^2$) in a manual spray process and, after evaporation of the solvent at room temperature, after a wait time of 30 minutes at 475° C., thermally densified in an oxygen containing atmosphere. The heating rate was 2 K min., the hold time at 475° C. was 1 hour, and the cooling to 290° C. was effected within 2.5 hours by blowing compressed air into the oven. After removal from the oven, the plates were cooled to room temperature. A shiny champagne-coloured coating was obtained, which, in terms of its roughness and its sliding behaviour, did not differ from a pigment-free coating produced in the same way.

Example 2

Interference Pigment-containing Coating on Pressed Stainless Steel Shaped Bodies with Right-angled Corners The pigment-containing coating sol from Example 1 was used to coat pressed stainless steel shaped bodies with right-angled corners in a manual spraying process, and, after evaporation of the solvent at room temperature, after a wait time of 30 minutes at 400° C., thermally consolidated in an oxygen containing atmosphere. The heating rate was 2 K/min., the hold time at 400° C. was 1 hour and the cooling to 290° C. was effected within 2.5 hours by blowing compressed air into the oven. Thereafter, the coated stainless steel shaped bodies were removed from the oven and cooled to room temperature within 45 minutes. A shiny, champagne-coloured coating was obtained, which, in terms of its tactile and antifingerprint properties, did not differ from a pigment-free coating produced in the same way.

Comparative Example

A suspension of the starting pigments had a particle diameter of 5 to 25 µm. A suspension of this interference pigment have been comminuted by the wet grinding process to a mean particle diameter of about 2 to 5 µm. No difference in the colour effect between the starting sample and the ground sample was detectable with the naked eye.

It can be seen from the light micrographs of the starting materials and of the ground product that the ground interference pigments are significantly finer than the untreated pigments and have an average size of 2 to 5 µm. It is completely surprising that the interference colours are retained virtually completely after comminution.

In the examples described above, brushed stainless steel plates were coated with silicate-containing coating suspensions as described above and densified. As a comparison, as well as coatings with the comminuted interference pigments, coatings with the starting particle size of the pigment as described above were also produced. The layer thickness was in each case about 5 µm. While the layers comprising the comminuted pigments have very smooth surfaces (arithmetic mean roughness value $R_a$=approx. 1 μm and peak-to-valley roughness $R_z$=approx. 7 μm), the other samples comprising the uncomminuted pigments exhibited a very rough surface ($R_a$=approx. 2 μm and $R_z$=approx. 11 μm).

What is claimed is:

1. A process for providing a substrate having a metal, glass or ceramic surface with a vitreous layer comprising an interference pigment, wherein the process comprises:
   (a) comminuting an interference pigment having at least one dielectric interference layer by a wet grinding process in an organic solvent as dispersion medium;
   (b) dispersing the comminuted interference pigment into a silicate-containing suspension to obtain a coating composition;
   (c) applying the coating composition to the metal, glass or ceramic surface by spraying; and
   (d) densifying the applied coating composition at a temperature of not more than 650° C. to form the vitreous layer;
and wherein in (a) a dispersing agent which comprises at least one of triethanolamine and γ-aminopropyltriethoxysilane is employed and/or wherein starting from interference pigments with a mean particle diameter of from 5 μm to 25 μm, on comminution to a mean particle diameter of from about 2 μm to 5 μm no difference in a color effect can be detected with a naked eye.

2. The process of claim 1, wherein the organic solvent comprises at least one alcohol having from 1 to 8 carbon atoms.

3. The process of claim 1, wherein the organic solvent comprises ethanol.

4. The process of claim 1, wherein in (a) a dispersing agent which comprises triethanolamine is employed.

5. The process of claim 1, wherein in (a) a dispersing agent which comprises γ-aminopropyltriethoxysilane is employed.

6. The process of claim 1, wherein in (a) a high-speed rotary ball mill with rotor and stator is employed.

7. The process of claim 6, wherein (a) is carried out for 1 to 6 hours.

8. The process of claim 1, wherein in (a) the pigment is comminuted to result in at least 90% of all particles, based on number, having a particle size below 6 μm.

9. The process of claim 1, wherein starting from interference pigments with a mean particle diameter of from 5 μm to 25 μm, on comminution to a mean particle diameter of from about 2 μm to 5 μm no difference in a color effect can be detected with a naked eye.

10. The process of claim 1, wherein the interference pigment comprises a pigment having an inorganic support selected from one or more of mica, $SiO_2$ glass, and metal foil.

11. The process of claim 1, wherein the interference pigment comprises one or more pigments in which mica is enveloped by one or more metal oxide layers.

12. The process of claim 1, wherein the silicate-containing suspension comprises a coating sol which comprises silicate particles modified with organic groups.

13. The process of claim 1, wherein the coating composition is applied in a wet film thickness of from 4 μm to 20 μm.

14. The process of claim 1, wherein the substrate is or comprises a metal part made of at least one of steel, stainless steel, aluminum, and brass.

15. A process for providing a substrate having a metal, glass or ceramic surface with a vitreous layer comprising an interference pigment, wherein the process comprises:
   (a) comminuting an interference pigment having at least one dielectric interference layer by a high-speed rotary ball mill with rotor and stator for 1 to 6 hours in an organic solvent which comprises at least one alcohol having from 1 to 8 carbon atoms as dispersion medium which comprises a dispersing agent;
   (b) dispersing the comminuted interference pigment into a silicate-containing suspension to obtain a coating composition;
   (c) applying the coating composition to the metal, glass or ceramic surface by spraying; and
   (d) densifying the applied coating composition at a temperature of not more than 650° C. to form the vitreous layer;
and wherein in (a) a dispersing agent which comprises at least one of triethanolamine and γ-aminopropyltriethoxysilane is employed and/or wherein starting from interference pigments with a mean particle diameter of from 5 μm to 25 μm, on comminution to a mean particle diameter of from about 2 μm to 5 μm no difference in a color effect can be detected with a naked eye.

16. The process of claim 15, wherein the organic solvent is ethanol.

17. The process of claim 16, wherein the dispersing agent comprises triethanolamine.

18. The process of claim 16, wherein the dispersing agent comprises γ-aminopropyltriethoxysilane.

19. The process of claim 15, wherein starting from interference pigments with a mean particle diameter of from 5 μm to 25 μm, on comminution to a mean particle diameter of from about 2 μm to 5 μm no difference in a color effect can be detected with a naked eye.

20. The process of claim 15, wherein the pigment is ground in the rotary ball mill at 1500 rpm for 3 hours.

* * * * *